(No Model.)  H. P. TENANT.  2 Sheets—Sheet 1.
GRAIN DRILL.

No. 256,764.  Patented Apr. 18, 1882.

Witnesses:
Jas. E. Hutchinson.
J. A. Rutherford

Inventor:
Hanson P. Tenant,
By his Attorney,
James L. Norris (No Model.) 2 Sheets—Sheet 2.
H. P. TENANT.
GRAIN DRILL.
No. 256,764. Patented Apr. 18, 1882.
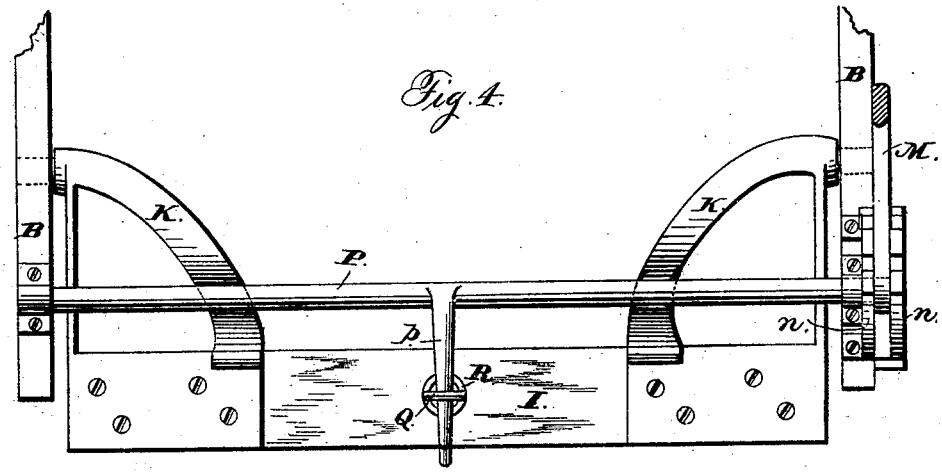
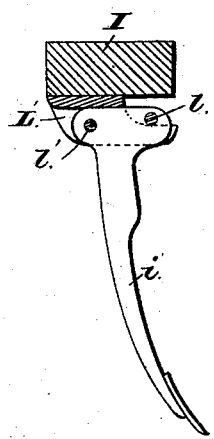
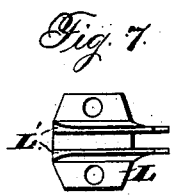
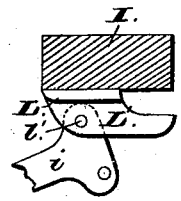
Witnesses:
Jas. E. Hutchinson
J. A. Rutherford
Inventor.
Hanson P. Tenant,
By his Attorney,
James L. Norris.

UNITED STATES PATENT OFFICE.

HANSON P. TENANT, OF RICHMOND, INDIANA, ASSIGNOR TO GAAR, SCOTT & COMPANY, OF SAME PLACE.

GRAIN-DRILL.

SPECIFICATION forming part of Letters Patent No. 256,764, dated April 18, 1882.

Application filed February 15, 1882. (No model.)

*To all whom it may concern:*

Be it known that I, HANSON P. TENANT, a citizen of the United States, residing at Richmond, in the county of Wayne and State of Indiana, have invented new and useful Improvements in Grain-Drills, of which the following is a specification.

This invention relates to grain drills or machines for sowing broadcast; and it has for its objects, first, to improve the construction of the scatterers, whereby the grain can be evenly distributed and its distribution regulated; secondly, to provide improved means for regulating the depth of penetration of the teeth; thirdly, to provide improved means for enabling said harrow attachment to yield to inequalities or obstructions in the ground and to rise against spring-pressure during action. These objects I attain by means of the devices illustrated in the accompanying drawings, in which—

Figure 1:
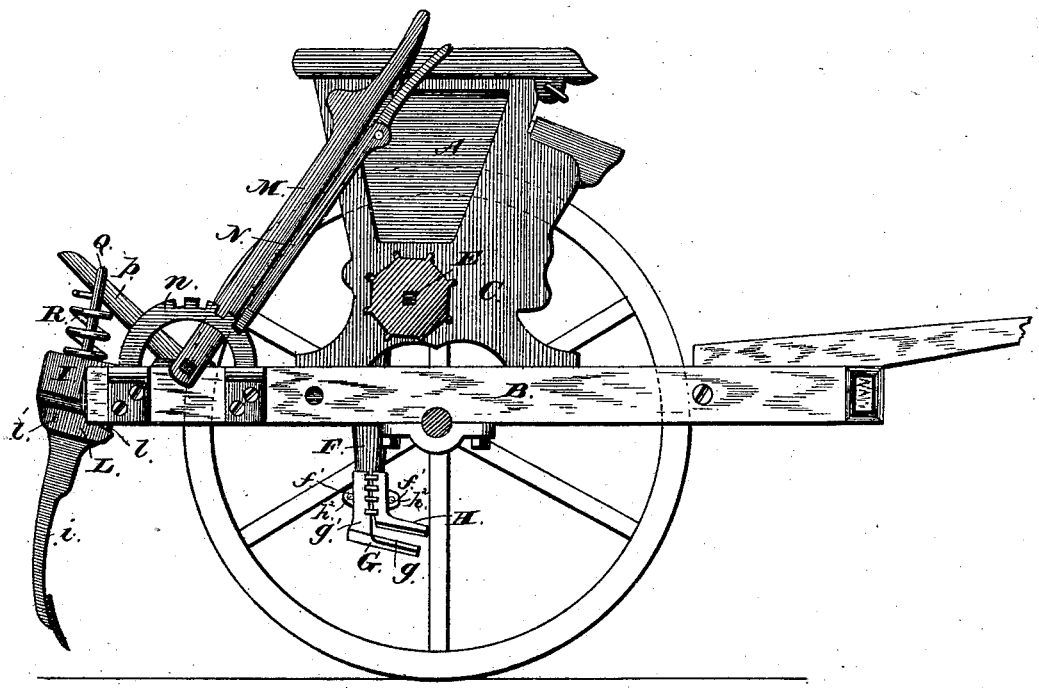
Figure 2:
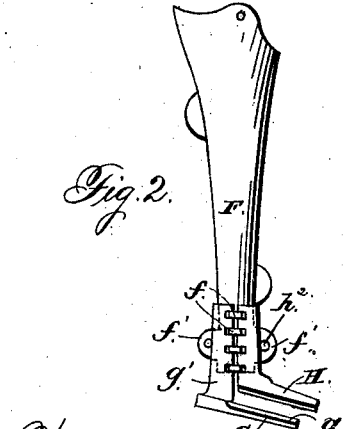
Figure 3:
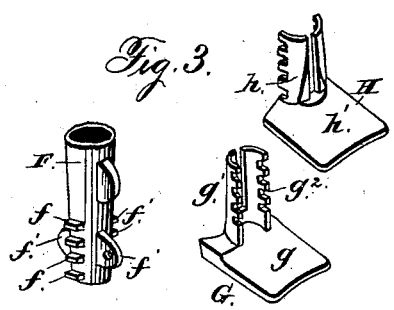

Figure 1 represents an end view of a seeding-machine embodying my invention; Fig. 2, a view of one of the seed-tubes detached, with the scatterer in position thereon; Fig. 3, detail views in perspective of the scatterer and the lower end of the seed-tube; Fig. 4, a detail plan view, showing the devices for adjusting the harrow attachment; Figs. 5, 6, and 7, detail views of the harrow-tooth and its attaching devices.

The drill is supported upon wheels, as usual, and is provided with the grain-hopper A, that is supported upon the side bars, B, of the main frame by means of the castings C, that are fastened to the ends of the hopper and secured upon the side bars. The seed-cups, which may be of any suitable form, are secured to the under side of the hopper, and the seed-wheels, arranged within the seed-cups, are mounted upon a common rotary axle, E, which has its bearings in the castings attached to the ends of the hopper, and which is driven in any ordinary way.

F indicates the seed-tubes, into which the grain is discharged from the seed-cups. Each seed-tube consists of a downwardly-tapering cylinder having formed upon opposite sides, at its lower end, the series of teeth $f$, and also having formed upon said lower end the two perforated ears $f'$, located at opposite sides of the tube and between the two lines of teeth.

The scatterer comprises two independent parts or sections, G and H, that are adapted to be attached to the seed-tube at variable heights from the ground and at different distances from each other. The lower part, G, of the scatterer consists of a foot-plate, $g$, formed with a slotted semi-cylindrical stem, $g'$, having along its vertical edges the teeth $g^2$, adapted to fit between the teeth upon the seed-tube. The part H of the scatterer is similarly constructed, with the exception that the concave side of the semi-cylindrical stem $h$ is reversed with relation to the plate $h'$, so that when the lower part or section is fitted to one side of the seed-tube, and the upper part or section fitted in like manner to the opposite side of the tube, the plate of the upper will be directly over the plate of the lower part or section of the scatterer. In applying these two parts of the scatterer to the seed-tube they are fitted to opposite sides of the same, their teeth meshing with the teeth on the seed-tube, while the ears upon the latter pass through the slots of their respective semi-cylindrical stems. In order to now retain the two parts of the scatterer in their connection with the seed-tube it will only be necessary to pass pins $h^2$ through the perforated lugs back of the aforesaid stems. By this construction it will be seen that each part of the scatterer is capable of an adjustment independent of the other, and that the height of the scatterer above the ground can be varied.

The foot-plate of the lower part of the scatterer is convexed upon its upper side, so that the grain falling upon it will be deflected more generally sidewise and forward than if the same were made perfectly straight.

The force of the rebound of the grain or seed is regulated by the upper plate of the part H of the scatterer, said plate constituting a shield which is adjustably located over the lower foot-plate. For grain of considerable specific gravity, which will have a greater rebound than light grain, the shield should be set lower down, so that it will govern the rebound and confine the distribution of the grain within the desired limit. The harrow attachment at the rear of the grain-drill comprises a swinging wooden bar, I, carrying a suitable number of teeth, i, and supported between the side bars of the main frame by means of the metal castings K, that are pivoted to the said side bars in rear of the main axle. In order to suspend the teeth from this swinging bar, a series of metal plates, L, each provided with a pair of depending lips, L', are secured to the said bar, and between each pair of lips is pivoted a tooth. The tooth is further connected with these lips by a wooden break-pin, l, located in advance of the pivot l', so that in case the tooth strikes a root, rock, or other obstacle the wooden break-pin will be broken, and hence allow the tooth to swing back upon its pivot, thereby avoiding injury to the tooth and other parts of the machine.

M indicates the hand-lever for raising or lowering the bar carrying the teeth, whereby the depth of penetration of the teeth can be regulated, or they can be raised entirely clear of the ground.

The brake-lever carries a spring latch-bar, N, arranged to engage in a pair of segment-racks, n, so that the lever can be adjusted at the required angle, and hence the teeth maintained at the required height. The hand or lifting lever is secured upon one end of a rock-shaft, P, that has its bearings on the side bars of the main frame. This rock-shaft has a central rearwardly-projecting arm, p, which engages in a staple, Q, upon the bar carrying the teeth. A spring, R, is arranged upon this staple between the bar and the arm, so as to form an elastic cushion for the harrow, and thereby give a certain vertical spring to the teeth, which will enable the entire set to adapt itself to inequalities of the ground, and also prevent breakage.

Having thus described my invention, what I claim is—

1. A scatterer for the seed-tube of a grain-drill, consisting of two independent sections, both adapted to be secured to the seed-tube, and to be adjusted thereon independently of each other, one of said sections being provided with a scattering-plate for the seed to fall upon and the other being provided with a shield adapted to overhang the said scattering-plate, substantially as described.

2. In a two-part scatterer for the seed-tube of a grain-drill, the upper section, H, of the scatterer, formed with a shield and adjustably secured to the seed-tube, whereby the shield can be raised or lowered with relation to the scattering-plate upon which the grain falls, substantially as described.

3. The combination, with the seed-tube provided at its lower end with teeth and perforated ears, of the two-part scatterer consisting of two sections, G and H, each formed of a semi-cylindrical slotted stem having teeth adapted to mesh with the teeth of the seed-tube, and having a projecting plate at the lower end of the stem, said stem being adapted to be applied to the seed-tube, and said plates being respectively adapted to serve as a shield and as a scattering-plate, substantially as described.

4. The combination, in a grain-drill, of the swinging bar I, carrying a suitable number of harrow-teeth, the castings K, secured to said bar and pivoted to the side bars of the main frame, the lifting-lever secured to a rock-shaft, P, and provided with a locking-latch, the segment-rack, the rock-shaft provided with a rearwardly-projecting arm, the staple secured to the bar carrying the teeth and receiving the arm of the rock-shaft, and the spring arranged around said staple and interposed between the arm of the rock-shaft and the said bar I, substantially as described.

In testimony whereof I have hereunto set my hand in the presence of two subscribing witnesses.

HANSON P. TENANT.

Witnesses:
W. J. ROBIE,
M. E. McMEANS.